(12) United States Patent
Xu (10) Patent No.: US 12,218,601 B2
(45) Date of Patent: Feb. 4, 2025

(54) FLYBACK CONVERTER AND CONTROL METHOD THEREOF

(71) Applicant: Joulwatt Technology Co., Ltd., Hangzhou (CN)

(72) Inventor: Xiangyong Xu, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 338 days.

(21) Appl. No.: 17/739,478

(22) Filed: May 9, 2022

(65) Prior Publication Data
US 2022/0376629 A1    Nov. 24, 2022

(30) Foreign Application Priority Data

May 7, 2021   (CN) .......................... 202110495588.2

(51) Int. Cl.
*H02M 3/335* (2006.01)
*H02M 1/00* (2006.01)
*H02M 1/08* (2006.01)

(52) U.S. Cl.
CPC ..... *H02M 3/33592* (2013.01); *H02M 1/0058* (2021.05); *H02M 1/08* (2013.01)

(58) Field of Classification Search
CPC ... H02M 3/33592; H02M 1/0058; H02M 1/08
See application file for complete search history.

(56) References Cited

U.S. PATENT DOCUMENTS

| | | | |
|---|---|---|---|
| 9,246,394 B2 * | 1/2016 | Deng ................ | H02M 3/33592 |
| 10,333,418 B2 * | 6/2019 | Song ................ | H02M 3/33592 |
| 2022/0052613 A1 * | 2/2022 | Xu .................... | H02M 3/33515 |

FOREIGN PATENT DOCUMENTS

| | | | |
|---|---|---|---|
| CN | 104065275 | | 9/2014 |
| CN | 212677084 | * | 3/2021 |

* cited by examiner

*Primary Examiner* — Kyle J Moody
(74) *Attorney, Agent, or Firm* — Treasure IP Group, LLC

(57) ABSTRACT

Disclosed is a flyback converter and a control method thereof. The flyback converter comprises: a transformer; a power switch; a driver; a synchronous rectifier; and a feedback control module, wherein the feedback control module is configured to output a primary-side turn-on signal when a new switching cycle is started; in each switching cycle, the feedback control module is configured to turn off a primary-side power switch according to a voltage across the synchronous rectifier and an output voltage of the flyback converter. The flyback converter only needs a single isolation device to achieve lossless equivalent peak current control and driving interlocking of primary side and the secondary side, and the synchronous rectifier can effectively prevent driving shoot-through of the primary side and the secondary side in terms of control without reducing a drive voltage, which further improves system efficiency and reliability.

20 Claims, 7 Drawing Sheets

- prior art -

FLYBACK CONVERTER AND CONTROL METHOD THEREOF

CROSS-REFERENCE TO RELATED APPLICATION

This application claims priority to Chinese patent application No. 202110495588.2, filed on May 7, 2021, published as CN113726165A on Nov. 30, 2021, and entitled "FLYBACK CONVERTER AND CONTROL METHOD THEREOF", the entire content of which is incorporated by reference in its entirety.

FIELD OF THE DISCLOSURE

The present disclosure relates to a technical field of power converters, in particular, to a flyback converter and a control method of a flyback converter.

DESCRIPTION OF THE RELATED ART

A flyback converter is an isolation-type power converter and commonly used for AC-to-DC and DC-to-DC conversion with current isolation between an input and one or more outputs. To improve efficiency, some flyback converter can implement synchronous rectification (or "dynamic rectification") technology and comprises a synchronous rectifier (SR) controller at a secondary side of that converter to control an SR switching element such as a synchronous rectifier, as shown in FIG. 1, which shows a schematic structural diagram of an existing flyback converter.

Figure 1:
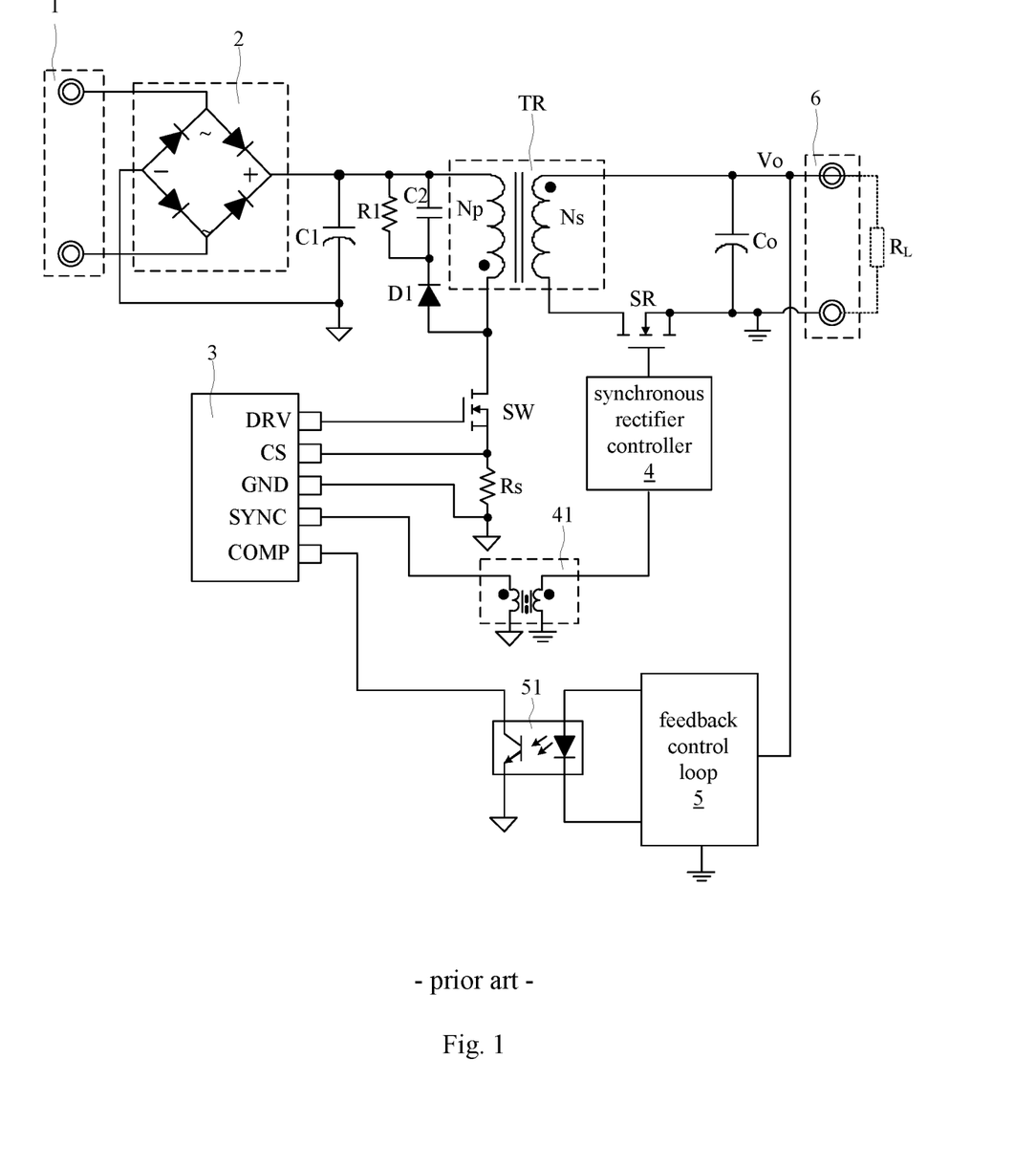
FIG. 1 shows a schematic structural diagram of an existing flyback converter according to the prior art.

Referring to FIG. 1, in a conventional flyback converter, a primary-side power switch SW is turned on and off by a primary-side controller 3, and a secondary-side voltage feedback signal is transmitted to the primary-side controller 3 through an optocoupler device 51. In order to be compatible with a CCM mode (i.e., continuous current mode, or "incomplete energy conversion mode") and a DCM mode (i.e., discontinuous current mode, or "complete energy conversion mode"), in terms of control method, a synchronous rectification controller 4 at the secondary side of the flyback converter is configured to begin to decrease a drive voltage when a current flowing through the synchronous rectifier SR becomes lower, thereby reducing shoot-through time in the CCM mode to reduce device stress. However, reducing the drive voltage may bring out a loss of efficiency.

In view of the above problem about efficiency loss, an existing solution is to add an isolation device 41 to interlock a drive signal of the synchronous rectifier controller 4 and a primary-side drive signal, so as to solve the shoot-through problem of the synchronous rectifier SR and the power switch SW under the CCM mode, so that the synchronous rectification controller 4 is not required to reduce the drive voltage in terms of control strategy, thereby optimizing system efficiency. However, according to this solution, an additional isolation device is added in the flyback converter, which increases cost and size, and limits the application of the flyback converter.

Therefore, it is necessary to provide an improved technical solution to overcome the above-mentioned technical problems existing in the prior art.

SUMMARY OF THE DISCLOSURE

In order to solve the above technical problems, according to the present disclosure, a flyback converter and a control method thereof are provided, wherein the flyback converter only needs a single isolation device to achieve lossless equivalent peak current control and driving interlocking of primary and secondary sides, and in terms of control of a synchronous rectifier, a drive shoot-through of the primary side and the secondary side can be effectively prevented without reducing a drive voltage, which further improves system efficiency and reliability. At the same time, equivalent peak current control of the flyback converter can also be realized without using a sampling resistor, and system loss is further reduced while ensuring a high efficiency of the system, and the circuit structure is simple.

According to a first aspect of the present disclosure, there is provided a flyback converter, comprising: a transformer, comprising a primary winding and a secondary winding;
a power switch and a voltage input circuit, which are connected to the primary winding;
a synchronous rectifier and a voltage output circuit, which are connected to the secondary winding;
a driver, connected to the power switch;
a feedback control module, connected to the synchronous rectifier and an output terminal of the flyback converter, respectively; and
an isolation element, connected to the driver and the feedback control module, respectively,
wherein, the feedback control module comprises:
a primary-side control signal generating unit, configured to output a primary-side turn-on signal to the driver when a new switching cycle of the flyback converter is started, and in each switching cycle, obtain a voltage to be compared according to a voltage across the synchronous rectifier and an output voltage of the flyback converter, and generate a primary-side turn-off signal to the driver according to a comparison result obtained by comparing the voltage to be compared and a reference voltage;
the driver is configured to implement turn-on control on the power switch according to the primary-side turn-on signal, and turn-off control on the power switch according to the primary-side turn-off signal.

In some embodiments, the flyback converter is operated under constant frequency control mode, and a start time of each switching cycle of the flyback converter is fixed; or
the flyback converter is operated under variable frequency control mode, and the primary-side control signal generating unit comprises:
a zero-crossing detection unit, configured to perform zero-crossing detection on the secondary winding to determine a start time of a new switching cycle.

In some embodiments, the primary-side control signal generating unit further comprises:
a calculation unit, configured to perform calculation on the voltage across the synchronous rectifier and the output voltage of the flyback converter according to a preset formula to obtain a voltage-controlled voltage;
a first capacitor;
a voltage-controlled current source, having a voltage-controlled input terminal receiving the voltage-controlled voltage, an output terminal connected to a first end of the first capacitor, wherein a second end of the first capacitor is connected to a reference ground;
a comparator, having a non-inverting input terminal connected to the first end of the first capacitor, an inverting input terminal receiving the reference voltage, and an output terminal connected to an input terminal of the isolation device,
wherein, a voltage of the first end of the first capacitor is the voltage to be compared.

In some embodiments, the primary-side control signal generating unit further comprises a sampling unit, which is configured to sample the voltage across the synchronous rectifier and the output voltage of the flyback converter.

In some embodiments, the reference voltage is an error amplification signal, and the feedback control module further comprises:
- an error amplification signal generating unit, connected to the output terminal of the flyback converter, and configured to generate the error amplification signal according to the output voltage of the flyback converter.

In some embodiments, the reference voltage is a voltage-type control reference signal, and the feedback control module further comprises:
- a voltage conversion unit, configured to convert the error amplification signal into the voltage-type control reference signal according to a preset relationship curve.

In some embodiments, the primary-side control signal generating unit further comprises: a mode detection unit and a switching switch,
- the mode detection unit is configured to detect a source-drain voltage of the synchronous rectifier and the output voltage of the flyback converter during a turn-off period of the power switch, and generate a turn-on signal to the switching switch when detecting that the source-drain voltage of the synchronous rectifier is greater than the output voltage of the flyback converter;
- the switching switch has a first current-conducting terminal connected to the first end of the first capacitor, a second current-conducting terminal connected to the second end of the first capacitor, and a control terminal connected to the mode detection unit, and the switching switch is configured to be turned on when receiving the turn-on signal to perform voltage reset on the first capacitor.

In some embodiments, when the mode detection unit detects that the source-drain voltage of the synchronous rectifier is less than or equal to the output voltage of the flyback converter during a turn-off duration of the power switch, the feedback control module further comprises: a sample-and-hold unit and an initial value acquisition unit,
- wherein the sample-and-hold unit is configured to sample the source-drain voltage of the synchronous rectifier at a turn-off time of the synchronous rectifier, and obtain current information of the synchronous rectifier at the turn-off time based on the source-drain voltage of the synchronous rectifier;
- the initial value acquisition unit is configured to obtain an initial value of the voltage across the first capacitor in a next switching cycle according to the current information of the synchronous rectifier or the source-drain voltage of the synchronous rectifier sampled by the sample-and-hold unit,
- wherein, the initial value is equal to a product of the source-drain voltage of the synchronous rectifier and a preset proportional coefficient.

In some embodiments, the voltage-controlled voltage is approximately equal to a difference between the voltage across the synchronous rectifier and the output voltage of the flyback converter.

In some embodiments, the flyback converter further comprises:
- a sampling resistor, connected between the power switch and the reference ground.

In some embodiments, the isolation element comprises any one of an isolation transformer, an optocoupler device, an isolation capacitor and an isolation chip.

In some embodiments, the feedback control module further comprises:
- a secondary-side control signal generating unit, configured to generate one of a secondary-side turn-on signal and a first secondary-side turn-off signal according to a voltage between two power terminals of the synchronous rectifier;
- a driving interlocking unit, configured to generate a second secondary-side turn-off signal when receiving the primary-side turn-on signal,
- wherein the synchronous rectifier is turned on when receiving the secondary-side turn-on signal, and is turned off when receiving any one of the first secondary-side turn-off signal and the second secondary-side turn-off signal.

According to a second aspect, a control method of a flyback converter is provided, wherein the flyback converter comprises a primary winding, a secondary winding, a power switch connected to the primary winding, and a synchronous rectifier connected to the secondary winding, and the control method comprises:
- generating a primary-side turn-on signal at a secondary side of the flyback converter at a start time of each switching cycle of the flyback converter;
- in each switching cycle, obtaining a voltage to be compared based on a voltage across the synchronous rectifier and an output voltage of the flyback converter, and generating a primary-side turn-off signal at the secondary side of the flyback converter according to a comparison result obtained by comparing the voltage to be compared and a reference voltage;
- transmitting the primary-side turn-on signal and the primary-side turn-off signal to a primary side of the flyback converter via a single isolation element, to control the power switch to be turned on and off alternately; and
- in each switching cycle, sampling a voltage between two power terminals of the synchronous rectifier, and controlling the synchronous rectifier to be turned on and off according to the primary-side turn-on signal and a sampling result obtained by the sampling.

In some embodiments, in each switching cycle, obtaining the voltage to be compared based on a voltage across the synchronous rectifier and an output voltage of the flyback converter, and generating the primary-side turn-off signal at the secondary side of the flyback converter according to the comparison result obtained by comparing the voltage to be compared and the reference voltage comprises:
- in each switching cycle, charging and discharging a first capacitor based on the voltage across the synchronous rectifier and the output voltage of the flyback converter, and when a voltage across the first capacitor is greater than the reference voltage, generating the primary-side turn-off signal at the secondary side of the flyback converter.

In some embodiments, when the flyback converter is operated under constant frequency control mode, start time of each switching cycle of the flyback converter is fixed;
- when the flyback converter is operated under variable frequency control mode, a zero-crossing detection on the secondary winding is performed, and the start time of each switching cycle is determined according to a zero-crossing detection result obtained by the zero-crossing detection.

In some embodiments, the reference voltage is an error amplification signal obtained according to the output voltage of the flyback converter; or the reference voltage is a voltage-type control reference signal obtained by converting an error amplification signal according to a preset relationship curve after the error amplification signal is obtained.

In some embodiments, charging and discharging the first capacitor based on the voltage across the synchronous rectifier and the output voltage of the flyback converter comprises:

sampling the voltage across the synchronous rectifier and the output voltage of the flyback converter;

performing calculation on the voltage across the synchronous rectifier and the output voltage of the flyback converter according to a preset formula to obtain a voltage-controlled voltage; and controlling a voltage-controlled current source to charge and discharge the first capacitor according to the voltage-controlled voltage.

In some embodiments, before generating the primary-side turn-on signal, the control method further comprises:

determining an operating mode of the flyback converter according to the voltage between the two power terminals of the synchronous rectifier and the output voltage of the flyback converter, and when it is determined that the flyback converter is operated under a DCM mode, performing voltage reset on the voltage across the first capacitor.

In some embodiments, controlling the synchronous rectifier to be turned on and off according to the primary-side turn-on signal and the sampling result obtained by the sampling comprises:

determining whether the voltage between the two power terminals of the synchronous rectifier satisfies a turn-off condition, and controlling the synchronous rectifier to be turned off when it is determined that the turn-off condition is satisfied; or controlling the synchronous rectifier to be turned off when it is detected that the primary-side turn-on signal is generated.

The beneficial effects of the present disclosure are as follows: the present disclosure discloses a flyback converter and a control method of a flyback converter. The flyback converter can realize turn-on/turn-off control of the primary-side power switch and the secondary-side synchronous rectifier at the same time through the feedback control module arranged at the secondary side, so only a single isolation device is needed during a drive process to realize the transmission of the primary-side drive signal from the secondary side to the primary side. The driving interlocking of the primary side and the secondary side can be easily realized at the secondary side without an additional isolation device, and the synchronous rectifier can effectively prevent driving shoot-through of the primary side and the secondary side without reducing the drive voltage in terms of control, which further improves system efficiency and reliability. At the same time, the feedback control module arranged at the secondary side is configured to obtain the voltage to be compared based on the voltages at the two terminals of the synchronous rectifier and the output voltage of the flyback converter, and then compare the voltage to be compared with the reference voltage to generate the primary-side turn-off signal, so that equivalent peak current control of the flyback converter can be realized without using a sampling resistor, and system loss is further reduced while ensuring a high efficiency of the system, and the circuit structure is simple.

It should be understood that the foregoing general description and the following detailed description are exemplary and explanatory only and are not intended to limit the present invention.

BRIEF DESCRIPTION OF THE DRAWINGS

The above and other objects, features and advantages of the present invention will become more apparent from the description below with reference to the accompanying drawings.

DETAILED DESCRIPTION OF EMBODIMENTS OF THE DISCLOSURE

To facilitate understanding of the present invention, the present invention is more comprehensively described below with reference to the related accompanying drawings. Preferred embodiments of the present invention are shown in the accompanying drawings. However, the present invention may be embodied in different forms and is not limited to the embodiments described herein. Rather, these embodiments are provided so that a thorough and complete understanding of the present disclosure is provided.

Hereinafter, the present invention will be described in detail with reference to the accompanying drawings.

As shown in FIG. 1, during a driving process of an existing flyback converter, a feedback control loop 5 arranged at a secondary side transmits an obtained error amplification signal COMP to an COMP pin of a driver 3 arranged at a primary side through an optocoupler isolation device 51. The driver 3 at the primary side generates a primary-side drive signal according to the error amplification signal COMP and a sampling voltage obtained by performing sampling on a sampling resistor Rs, to control a primary-side power switch SW to be turned on and off. A synchronous rectifier controller 4 arranged at the secondary side generates a secondary-side control signal according to a sampling result of an output voltage Vo and/or a voltage Vds_SR between two power terminals of a synchronous rectifier SR, so as to drive the synchronous rectifier SR at the secondary side. At the same time, in order to realize driving interlocking of the power switch SW and the synchronous rectifier SR and prevent drive shoot-through of the primary side and the secondary side, the driver 3 at the primary side is provided with a synchronous pin SYNC, which is configured to transmit, through another isolation device 41, a primary-side control signal generated by the driver 3 to the synchronous rectifier controller 4 at the secondary side, to adjust the secondary-side control signal, so as to drive secondary-side power. However, the isolation devices 41, 51 and associated circuit structures increase cost and size of the system, which limits the application of the flyback converter.

Figure 2:
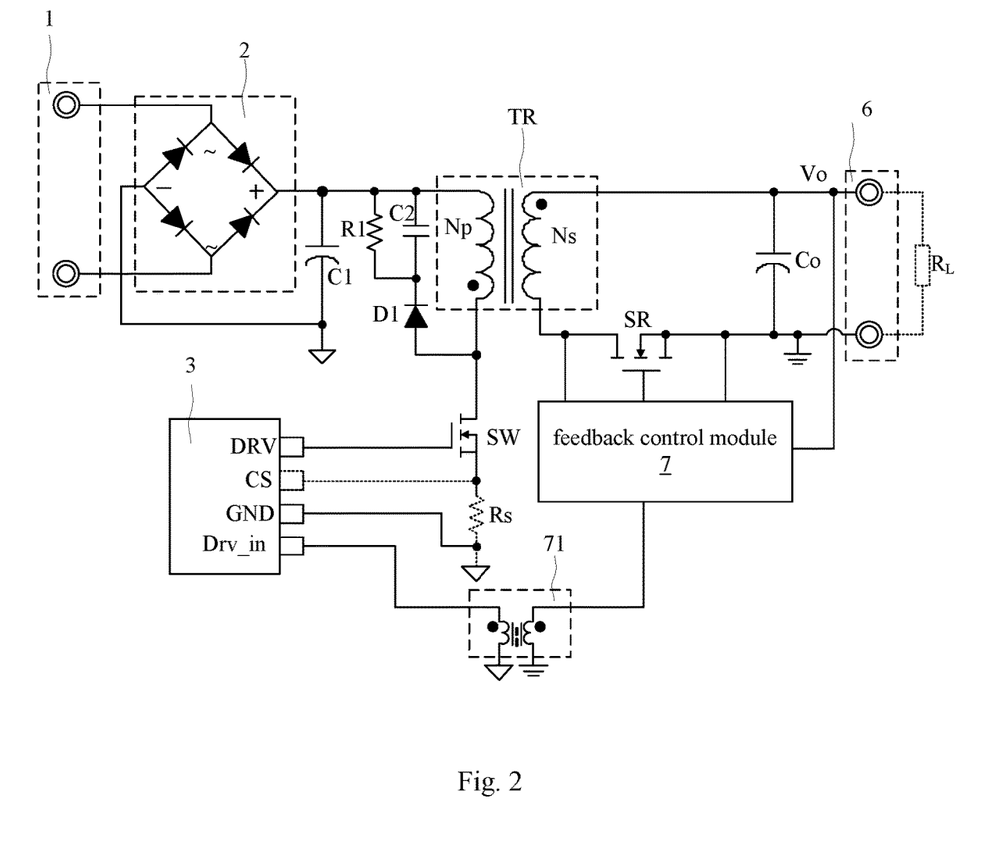
FIG. 2 shows a schematic structural diagram of a flyback converter according to an embodiment of the present disclosure.

In view of the above problems, the present disclosure provides a flyback converter. As shown in FIG. 2, in an implementation of the present disclosure, the flyback converter comprises: a transformer TR comprising a primary winding $N_P$ and a secondary winding $N_S$, a voltage input circuit connected to the primary winding $N_P$, a voltage output circuit connected to the secondary winding $N_S$, a power switch SW, a driver 3, a synchronous rectifier SR, a feedback control module 7 and an isolation element 71.

The voltage input circuit comprises a rectifier 2 and an input capacitor C1. The rectifier 2 can be connected to a power supply through a first connection port 1, so that the power supply can provide electrical energy to the flyback converter. The power supply may comprises, but is not limited to, a grid, an electric generator, a transformer, a battery, a solar panel, a wind turbine, a regenerative braking system, a hydraulic or wind generator, or any other form of apparatus capable of providing the electrical energy to the flyback converter.

Further, the voltage input circuit further comprises a first resistor R1, a second capacitor C2 and a first diode D1, which are disposed between a dotted terminal and a non-dotted terminal of the primary winding Np of the transformer TR. The first resistor R1 and the second capacitor C2 are connected in parallel with each other between the non-dotted terminal of the primary winding $N_P$ and a cathode of the first diode D1, and an anode of the first diode D1 is connected to the dotted terminal of the primary winding $N_P$. In this way, a leakage inductance current of the primary winding $N_P$ can be absorbed, thereby improving the performance of the transformer.

The voltage output circuit comprises an output capacitor Co, which can be connected to a load through a second connection port 6, and the load receives electrical energy (e.g., voltage and current) output by the flyback converter which performs conversion. In some embodiments, the electrical energy output by the flyback converter also passes through a filter before reaching the load. In some embodiments, the filter is a sub-component of the flyback converter, an external component of the flyback converter, and/or a sub-component of the load. In any case, the load can use filtered or unfiltered electrical energy from the flyback converter to perform functions. Optionally, the load may comprise, but is not limited to, a computing device and related components, such as a microprocessor, an electrical component, a circuit, a laptop, a desktop, a tablet, a mobile phone, a battery, a speaker, a lighting unit, a related component of an automotive/ships/airlines/trains, a motor, a transformer, or any other type of electrical equipment and/or circuit that may receive voltage or current from the flyback converter.

In FIG. 2, the load is equivalently represented as a load resistance $R_L$, and is represented by a dashed line.

The power switch SW has a first power terminal connected to the dotted terminal of the primary winding Np, and a second power terminal connected to a reference ground. In a possible embodiment, the power switch SW is an NMOS field effect transistor, the first power terminal is a drain of the NMOS field effect transistor, and the second power terminal is a source of the NMOS field effect transistor, and a control terminal of the power switch SW is a gate of the NMOS field effect transistor. Alternatively, the power switch SW may also be a PMOS field effect transistor.

The driver 3 comprises a DRV pin (i.e., control signal output pin), a GND pin (i.e., ground pin), and a Drv_in pin (i.e., drive signal input pin). The DRV pin of the driver 3 is connected to the control terminal of the power switch SW, the GND pin is connected to the reference ground, and the Drv_in pin is connected to the output terminal of the isolation element 71.

The synchronous rectifier SR is connected between a non-dotted terminal of the secondary winding $N_S$ and the reference ground. In a possible embodiment, the synchronous rectifier SR is an NMOS field effect transistor, having a drain connected to the non-dotted terminal of the secondary winding $N_S$, and a source connected to the reference ground. Alternatively, the synchronous rectifier SR may also be a PMOS field effect transistor.

The feedback control module 7 has a first input terminal connected to the non-dotted terminal of the secondary winding $N_S$ (i.e., the drain of the synchronous rectifier SR), a second input terminal connected to the reference ground (i.e., the source of the synchronous rectifier SR), a third input terminal connected to an output terminal of the flyback converter, a first output terminal connected to a gate of the synchronous rectifier SR, and a second output terminal connected to an input terminal of the isolation element 71.

Optionally, the isolation element 71 may be chosen as any one of an isolation transformer, an optocoupler device, an isolation capacitor and an isolation chip. Through the isolation element 71, signal transmission from the second output terminal of the feedback control module 7 to the Drv_in pin of the driver 3 can be realized.

Figure 3:
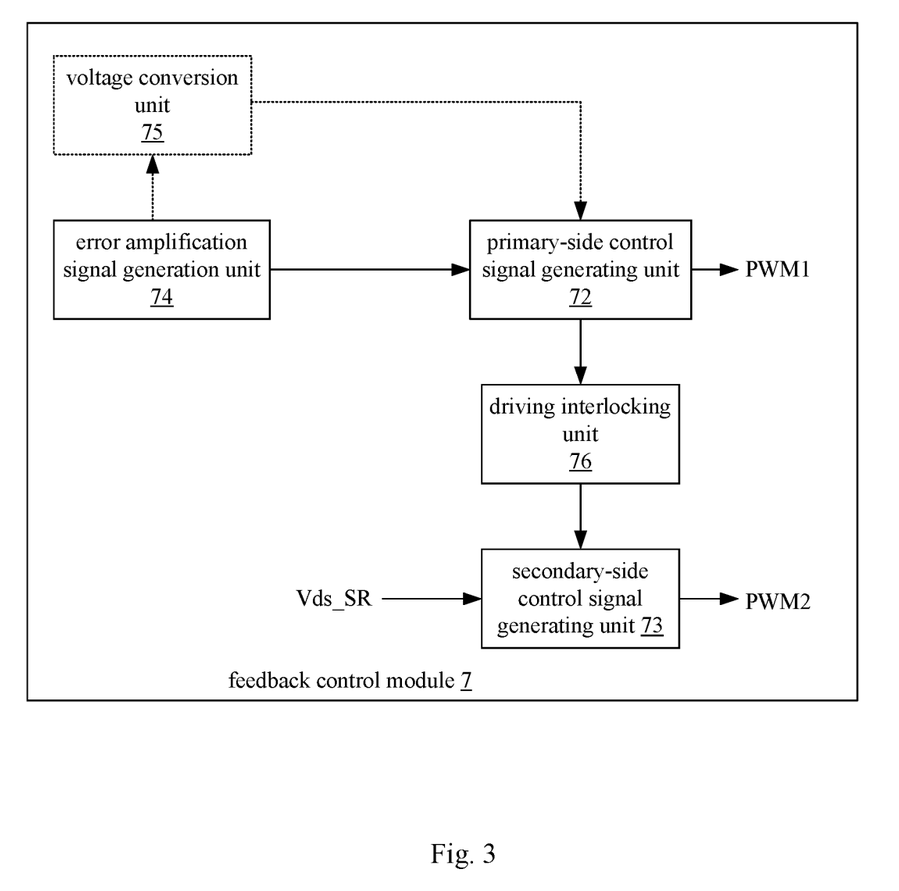
FIG. 3 shows a structural block diagram of a feedback control module according to an embodiment of the present disclosure.

As shown in FIG. 3, according to the present disclosure, the feedback control module 7 is provided with a primary-side control signal generating unit 72 and a secondary-side control signal generating unit 73. The secondary-side control signal generating unit 73 is configured to generate a corresponding secondary-side control signal. Specifically, the secondary-side control signal generation unit 73 is configured to sample a voltage Vds_SR between the two power terminals of the synchronous rectifier SR in each switching cycle of the flyback converter, and correspondingly generate a secondary-side turn-on signal or a first secondary-side turn-off signal to the synchronous rectifier SR according to a sampling result, that is, a voltage change of the voltage Vds_SR, so as to realize turn-on or turn-off control on the synchronous rectifier SR. A method and specific circuit structure for generating the secondary-side turn-on signal and/or the secondary-side turn-off signal by sampling the voltage Vds_SR between the two power terminals of the synchronous rectifier SR can be realized according to the prior art, and will not be described in detail here.

The primary-side control signal generating unit 72 is configured to generate a corresponding primary-side control signal PWM1. Specifically, the primary-side control signal generating unit 72 is configured to output a primary-side turn-on signal to the driver 3 when a new switching cycle of the flyback converter is started, and the driver 3 is configured to realize turn-on control on the power switch SW according to the primary-side turn-on signal. The primary-side control signal generation unit 72 is further configured to obtain a voltage to be compared according to the voltage Vds_SR across the synchronous rectifier SR and the output voltage Vo of the flyback converter in each switching cycle, and output a primary-side turn-off signal to the driver 3 according to a comparison result obtained by comparing the voltage to be compared and a reference voltage, and the driver 3 is configured to realize turn-off control on the power switch SW according to the primary-side turn-off signal.

The feedback control module 7 disposed at the secondary side of the flyback converter can realize turn-on/turn-off control on the power switch SW and the synchronous rectifier SR at the same time. The driver 3 at the primary side actually only needs to implement level shifting function, that is, converting the primary-side turn-on signal or the primary-side turn-off signal generated by the feedback control module 7 into a suitable voltage signal that can control the power switch SW to be turned on/off. Therefore, in a driving process, only a single isolation device 71 for transmitting the primary-side drive signals (comprising the primary-side turn-on signal and the primary-side turn-off signal) from the secondary side to the primary side is required. When driving interlocking of the primary side and the secondary side is realized, no additional isolation device for transmitting the primary-side drive signals from the primary side to the secondary side is needed while drive shoot-through of the primary side and the secondary side can be effectively prevented, and the drive voltage of the synchronous rectifier SR does not need to be reduced in terms of control, which further improves system efficiency and reliability, and at the same time simplifies design requirements on the driver 3 at the primary side to a certain extent.

Figure 4:
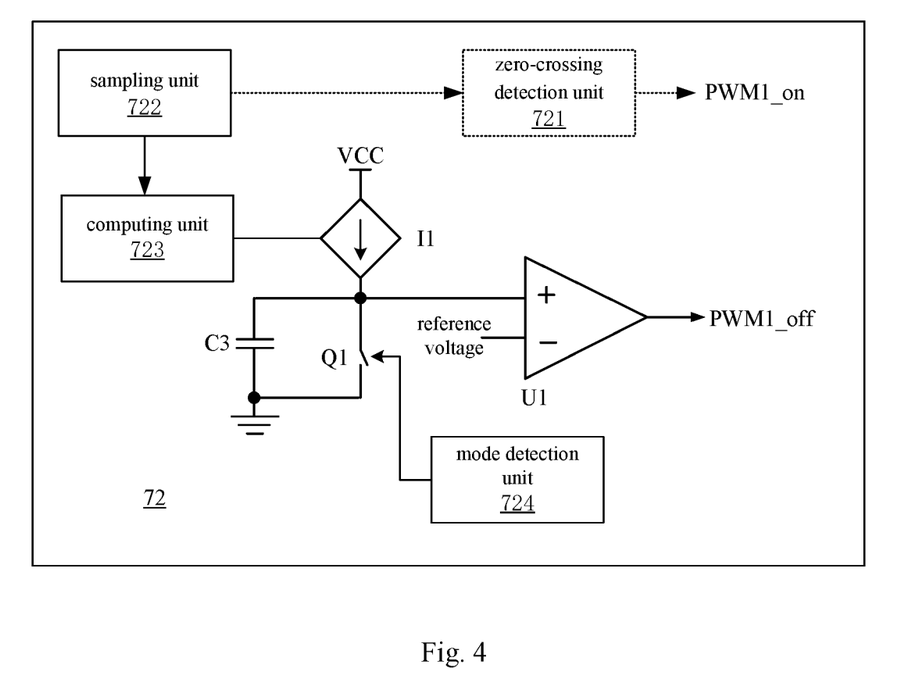
FIG. 4 shows a structural schematic diagram of a primary-side control signal generating unit according to an embodiment of the present disclosure.

Specifically, the flyback converter according to the present disclosure can operate under a constant frequency control mode or a variable frequency control mode. Under a condition that a switching control frequency of the flyback converter is known, and a start time of each switching cycle of the flyback converter is fixed, then the feedback control module 7 can generate, according to a requirement on switching control frequency of the flyback converter, a primary-side turn-on signal PWM1_on at corresponding timing to represent that a new switching cycle is started. Meanwhile, when the flyback converter is controlled in a variable frequency control mode, such as a frequency control mode based on QR (Quasi-resonant) or ZVS (zero voltage switching), a zero-crossing detection unit 721 can be set in the feedback control module 7 to perform zero-crossing detection on the secondary winding $N_S$, and a start time of a new switching cycle is determined according to a zero-crossing detection result, as shown in FIG. 4. Wherein, a method and a specific circuit structure for determining the start time of the new switching cycle according to the zero-crossing detection unit 721 can be implemented according to the prior art, which will not be described in detail here.

As an example, in a possible embodiment according to the present disclosure, the voltage to be compared is obtained by charging and discharging a capacitor through the voltage across the synchronous rectifier and the output voltage of the flyback converter. For details, please refer to FIG. 4 and related descriptions. In another embodiment according to the present disclosure, the voltage to be compared which varies with time can be obtained by reasonable calculation of the voltage Vds_SR across the synchronous rectifier SR and the output voltage Vo of the flyback converter, so that turn-on and turn-off control on the primary side and the secondary side of the flyback converter can be realized without using a sampling resistor.

As shown in FIG. 4, the primary-side control signal generating unit 72 further comprises: a first capacitor C3, a comparator U1, a voltage-controlled current source I1 and a switching switch Q1. A voltage-controlled input terminal of the voltage-controlled current source I1 receives a voltage-controlled voltage, an output terminal of the voltage-controlled current source I1 is connected to a first end of the first capacitor C3, and a second end of the first capacitor C3 is connected to the reference ground. A non-inverting input terminal of the comparator U1 is connected to the first end of the first capacitor C3, an an inverting input terminal of the comparator U1 receives a reference voltage. An output terminal of the comparator U1 is connected to the input terminal of an isolation device 71, so as to output a corresponding primary-side turn-off signal PWM1_off to the input terminal of an isolation device 71 according to a different comparison result. A voltage of the first end of the first capacitor C3 is the voltage to be compared mentioned above, and when a voltage of the non-inverting input terminal of the comparator U1 is greater than a voltage of its inverting input terminal (that is, the voltage to be compared is greater than the reference voltage), the comparator U1 is configured to output the primary-side turn-off signal PWM1_off to the input terminal of the isolation device 71.

Optionally, the primary-side control signal generating unit 72 is further provided with a mode detection unit 724. The mode selection unit 724 is configured to detect the source-drain voltage Vds_SR of a synchronous rectifier SR and the output voltage Vo of the flyback converter during a turn-off period of the power switch SW, wherein when it is detected that the source-drain voltage Vds_SR of the synchronous rectifier SR is greater than the output voltage Vo of the flyback converter, it is determined that the flyback converter at this time is operated under a DCM mode and a turn-on signal is generated; and when it is detected that the source-drain voltage Vds_SR of the synchronous rectifier SR is less than or equal to the output voltage Vo of the flyback converter, it is determined that the flyback converter at this time is operated under a CCM mode. A BCM mode is a critical mode when the operating mode of the flyback converter switches from the DCM mode to the CCM mode. A first current-conducting terminal of the switching switch Q1 is connected to the first end of the first capacitor C3, a second current-conducting terminal of the switching switch Q1 is connected to the second end of the first capacitor C3, and a control terminal of the switching switch Q1 is connected to the mode detection unit 724. The switching switch Q1 is configured to be turned on when receiving the turn-on signal output by the mode detection unit 724, so as to perform voltage reset on the first capacitor C3.

Further, when the mode detection unit 724 detects that the flyback converter is operated under the CCM mode, the feedback control module 7 further comprises a sample-and-hold unit and an initial value acquisition unit. The sample-and-hold unit is configured to sample the source-drain voltage (referred to as Vds_SRoff) of the synchronous rectifier SR at a turn-off time of the synchronous rectifier SR, and obtain current information of the synchronous rectifier SR at the turn-off time of the synchronous rectifier SR based on the source-drain voltage Vds_SRoff. The initial value acquisition unit is configured to obtain an initial value (referred to as $Ramp_0$) of a voltage across a first capacitor C3 in a next switching cycle according to the current information of the synchronous rectifier SR or the source-drain voltage Vds_SRoff sampled by the sample-and-hold unit, so that the voltage Ramp across the first capacitor C3 can start to rise from the initial value $Ramp_0$ in the next switching cycle. The initial value $Ramp_0$ is equal to a product of the source-drain voltage Vds_SRoff of the synchronous rectifier SR and a preset proportional coefficient. In the CCM mode, the initial value $Ramp_0$ of the voltage across the first capacitor C3 in the next switching cycle is determined according to the source-drain voltage Vds_SRoff or current information at a moment when the synchronous rectifier SR is turned off in the current switching cycle, so that a turn-on time and a turn-off time of the primary side and of the secondary side in the flyback converter can be controlled, and control of current in the flyback converter can be further realized, and current in the CCM mode can be prevented from being out of control.

In the present disclosure, a calculation unit 723 is provided in the primary-side control signal generation unit 72, and the calculation unit 723 is configured to perform calculation, according to a corresponding preset formula, on the voltage Vds_SR across the synchronous rectifier SR and the output voltage Vo of the flyback converter according to a current operating mode of the flyback converter, so as to obtain the voltage-controlled voltage. Optionally, during concrete implementation process, the function of the calculation unit 723 may be realized by calculating the output voltage Vo of the flyback converter and the voltage Vds_SR between the two terminals of the synchronous rectifier SR sampled by a sampling unit 722, by use of an arithmetic circuit such as an adder and a subtractor, or be realized by executing programme calculation on the output voltage Vo of the flyback converter and the voltage Vds_SR between the two terminals of the synchronous rectifier SR sampled by a sampling unit 722, based on an operation program in a corresponding processing chip. Optionally, the sampling unit 722 may be a separately set sampling unit in the primary-side control signal generating unit 72, or may also be a unit with a sampling function that is shared with other functional units in the feedback control unit 7.

In an embodiment, which takes a low-voltage type synchronous rectifier SR as an example, the voltage-controlled voltage output by the computing unit 723 is approximately equal to a difference between the voltage Vds_SR across the synchronous rectifier SR and the output voltage Vo of the flyback converter, i.e., Vds_SR-Vo. Furthermore, a magnitude of the current output by the voltage-controlled current source I1 at this time is i1=k*(Vds_SR-Vo), where k is a variation ratio between the voltage-controlled voltage input to the voltage-controlled current source I1 and the output current of the voltage-controlled current source I1.

In this embodiment, for selecting a capacitance parameter of the first capacitor C3, it only needs to satisfy that during a turn-on period of the power switch SW, whatever the operating mode is, a maximum value that the voltage Ramp between the two ends of the first capacitor C3 can reach under an action of the output current of the voltage-controlled current source I1 is greater than the reference voltage received by the inverting input terminal of the comparator U1.

Further, for the reference voltage received by the inverting input terminal of the comparator U1, in an embodiment of the present disclosure, the reference voltage is an error amplification signal COMP generated by the error amplification signal generation unit 74 provided in the feedback control module 7 according to the output voltage Vo of the flyback converter, wherein the error amplification signal COMP can be used to feedback the output voltage Vo of the flyback converter. It can be known from an operation principle of the flyback converter that a moment when the voltage across the first capacitor C3, which is charged by the current output by the voltage-controlled current source I1 based on the voltage Vds_SR across the synchronous rectifier SR and the output voltage Vo of the flyback converter, is greater than the error amplification signal COMP, is a moment that the primary-side current of the flyback converter reaches a peak value, and is also a moment that the power switch SW of the primary side is turned off. The method for generating the error amplification signal COMP by the error amplification signal generating unit 74 can be implemented according to the prior art, and will not be described in detail here. For example, after comparing the sampled output voltage Vo of the flyback converter with a reference voltage by use of an error amplifier, the error amplification signal COMP can be generated according to a comparison result obtained by that comparison, and so on.

However, when the error amplification signal COMP serves as the reference voltage, as the error amplification signal COMP becomes lower, under a constant input voltage, the turn-on duration of the power switch SW of the primary side would correspondingly decrease, thereby making the primary-side current (denoted as Ipeak) decrease linearly. At this time, if the flyback converter is operated under light load mode and a switching frequency of the system is not reduced, operating efficiency of the flyback converter would decrease under light load. Therefore, in another embodiment of the present disclosure, based on a variation relationship between the primary-side current Ipeak and the error amplification signal COMP, a voltage-type control reference signal Cs is used as the reference voltage received by the inverting input terminal of the comparator U1, so as to ensure the operating efficiency of the flyback converter under the light load mode.

Figure 5:
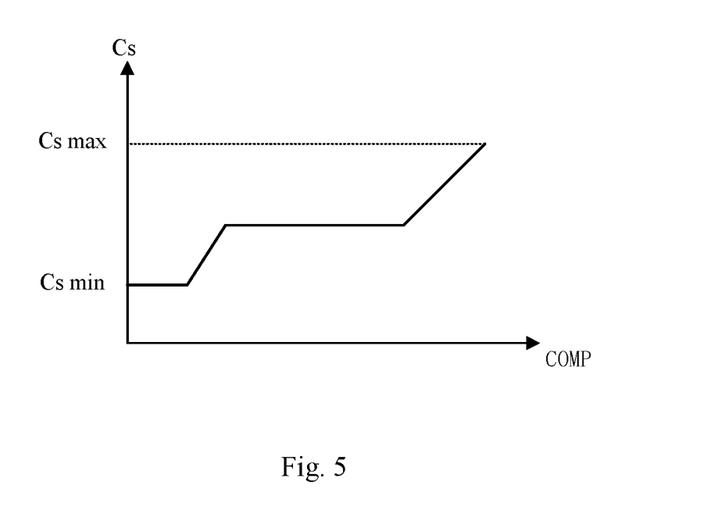
FIG. 5 shows a schematic diagram of a relationship curve between an error amplification signal and a voltage-type control reference signal according to an embodiment of the present disclosure.

In a specific implementation process, referring to FIG. 3, the voltage-type control reference signal Cs can be obtained by converting the error amplification signal COMP by use of a voltage conversion unit 75 disposed in the feedback control module 7 according to a preset relationship curve. As an example, the preset relationship curve is shown in FIG. 5. It can be seen from FIG. 5 that in a certain variation range of the error amplification signal COMP, the voltage-type control reference signal Cs is a fixed value, so that within a same variation time period, a variation of the voltage-type control reference signal Cs is significantly less than that of the error amplification signal COMP, that is, when the voltage-type control reference signal Cs serves as the comparison reference of the comparator U1, it can effectively make improvement towards the problem that the operating efficiency of the flyback converter is reduced under light load.

Further, the feedback control module 7 is further provided with a driving interlocking unit 76, and the driving interlocking unit 76 is configured to generate a second secondary-side turn-off signal when receiving a primary-side turn-on signal PWM1_on. The synchronous rectifier SR is configured to be turned off when receiving any one of the first secondary-side turn-off signal output by the secondary-side control signal generating unit 73 and the second secondary-side turn-off signal output by the driving interlocking unit 76, thereby realizing driving interlocking of the primary side and the secondary side of the flyback converter to prevent the primary side and the secondary side from being turned on at the same time. Meanwhile, in a specific implementation, the driving interlocking of the primary side and the secondary side of the flyback converter can be realized by setting a gate logic circuit or a corresponding circuit at the control terminal of the synchronous rectifier SR.

In the present disclosure, since the primary-side turn-on unit is also generated at the secondary side, the feedback control module 7 does not need an additional isolation device to receive a feedback signal from the primary side.

Figure 8:
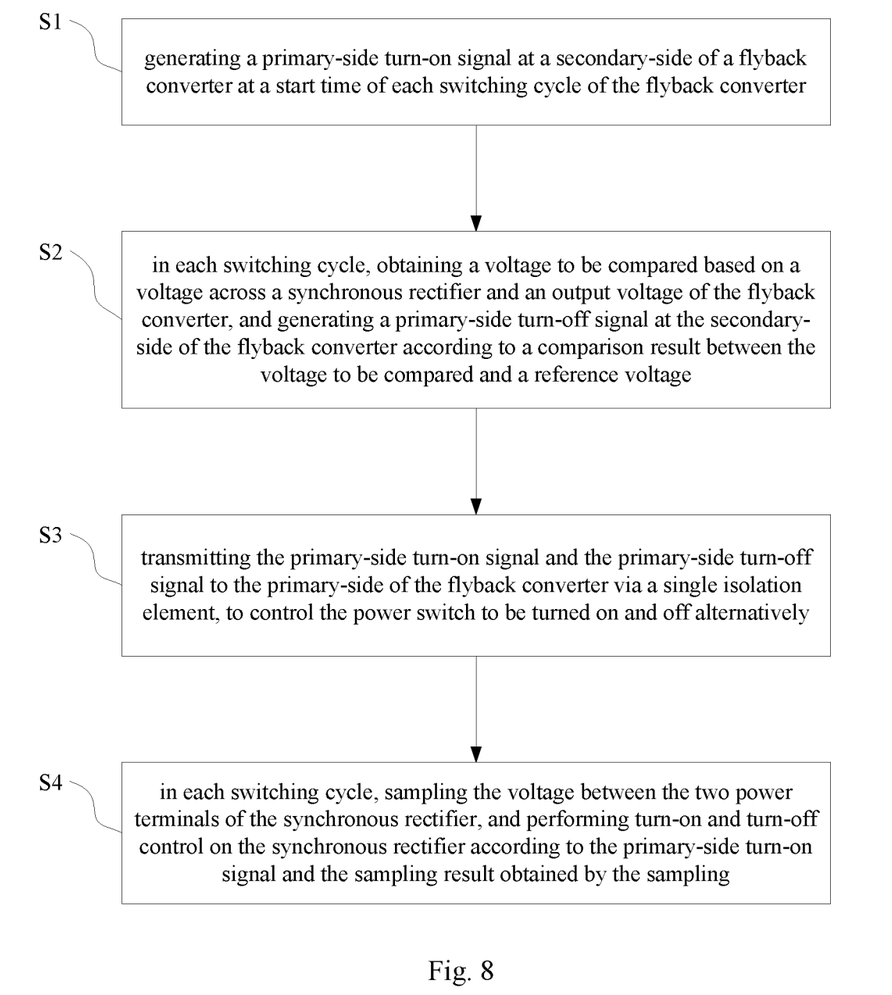
FIG. 8 shows a flow block diagram of a control method of a flyback converter according to an embodiment of the present disclosure.

With reference to FIG. 2 to FIG. 8, the control method and the operating principle of the flyback converter are described as follows:

Referring to FIG. 8, the control method of the flyback converter comprises: generating a primary-side turn-on signal at a secondary side of the flyback converter at a start time of each switching cycle of the flyback converter (step S1); in each switching cycle, obtaining a voltage to be compared based on a voltage across a synchronous rectifier and an output voltage of the flyback converter, and generating a primary-side turn-off signal at the secondary side of the flyback converter according to a comparison result obtained by comparing the voltage to be compared and a reference voltage (step S2); transmitting the primary-side turn-on signal and the primary-side turn-off signal to a primary side of the flyback converter through a single isolation element, and performing turn-on and turn-off control on the power switch alternately (step S3); and, in each switching cycle, sampling the voltage between the two power terminals of the synchronous rectifier, and performing turn-on and turn-off control on the synchronous rectifier according to the primary-side turn-on signal and the sampling result obtained by the sampling (step S4).

As an example, in a possible embodiment of the present disclosure, the voltage to be compared is obtained by charging and discharging a capacitor through the voltage across the synchronous rectifier and the output voltage of the flyback converter. For details, please refer to FIG. 4 and its related descriptions. In other embodiments of the present disclosure, the voltage Vds_SR across the synchronous rectifier SR and the output voltage Vo of the flyback converter can also be reasonably calculated to obtain the voltage to be compared which varies with time, so that turn-on and turn-off control on the primary side and the secondary side of the flyback converter can be realized without using a sampling resistor.

Figure 6:
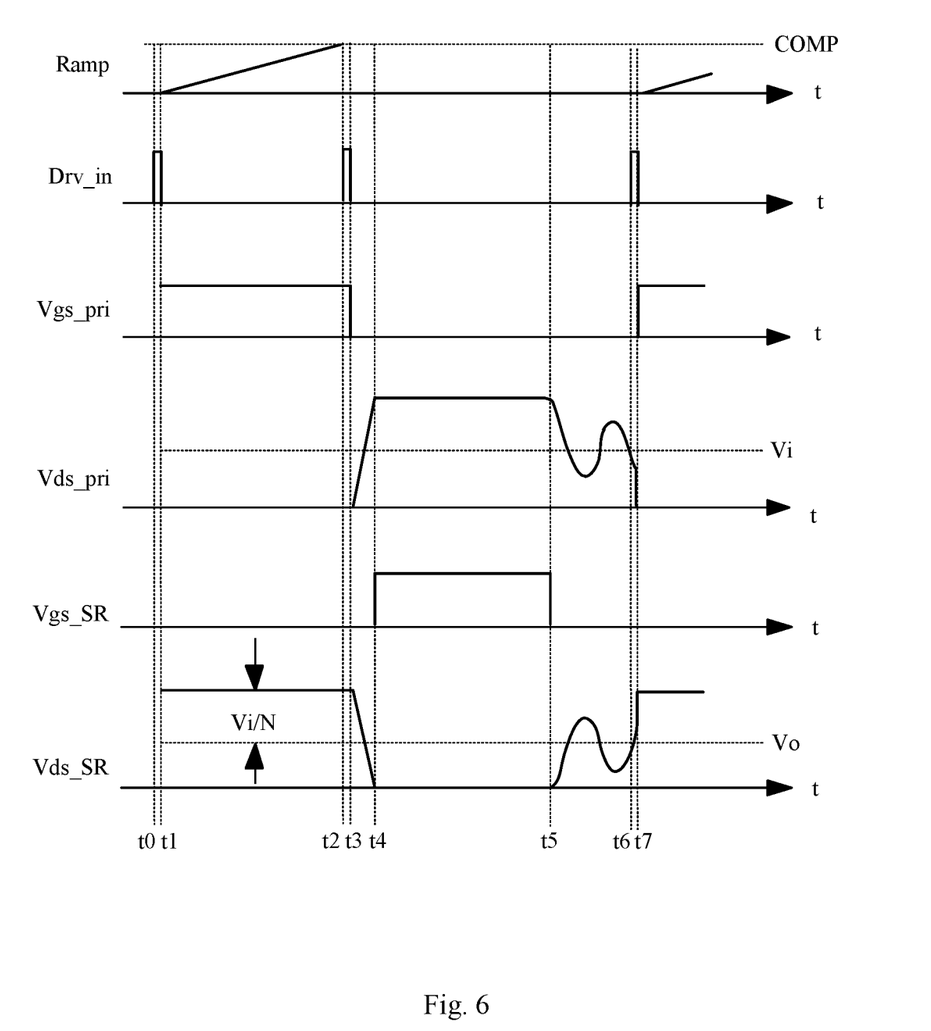
FIG. 6 shows a timing waveform diagram of some signals in a flyback converter according to an embodiment of the present disclosure.

In some embodiments, referring to FIG. 6, taking one switching cycle of the flyback converter as an example, at time t0, a feedback control module 7 at a secondary side of a flyback converter determines that this moment is the start time of the switching cycle of the flyback converter according to a control frequency of the system, and transmits a pulse signal to the driver 3 through an isolation element 71 as a primary-side turn-on signal PWM1_on, and when the driver 3 detects a falling edge of the pulse signal at time t1, it controls the power switch SW to be turned on. When the flyback converter is operated under a constant frequency control mode, the start time of each switching cycle is fixed, and the feedback control module 7 is only required to transmit the primary-side turn-on signal PWM1_on to the driver 3 at the primary side at a fixed timing. When the flyback converter is operated under a variable frequency control mode, the feedback control module 7 can perform zero-crossing detection on the secondary winding $N_S$, and determine the start time of each switching cycle according to a result obtained by the zero-crossing detection.

During a time period t1~t2, a gate-source voltage Vgs_pri of the power switch SW is at high level, the power switch SW is under turn-on state, a source-drain voltage Vds_pri across the power switch SW is at low level, and a current on the primary winding $N_P$ of a transformer TR rises linearly from zero, so that the transformer TR stores energy. During this time period, a gate-source voltage Vgs_SR of a synchronous rectifier SR is at low level, the synchronous rectifier SR is under turn-off state, and a source-drain voltage Vds_SR across the synchronous rectifier SR is at high level, which is greater than the output voltage Vo of the flyback converter, and a difference between the source-drain voltage Vds_SR across the synchronous rectifier SR and the output voltage Vo is a voltage Vi/N across the secondary winding $N_s$ of the transformer TR, where Vi is an input voltage of the flyback converter. At the same time, within this time period, a voltage-controlled current source I1 charges a first capacitor C3 according to a voltage-controlled voltage which is greater than 0, so that a voltage Ramp across the first capacitor C3 begins to gradually increase. The specific charging process can be understood according to the foregoing description of FIG. 4.

The feedback control module 7 uses the error amplification signal COMP obtained by the error amplification signal generation unit 74 according to the output voltage Vo of the flyback converter as the reference voltage, or uses the voltage-type control reference signal Cs obtained by converting the error amplification signal COMP by use of the voltage conversion unit 75 according to the preset relationship curve as the reference voltage, and after it is detected by the comparator U1 that the voltage Ramp across the first capacitor C3 rises to be greater than a reference voltage, the feedback control module 7 generates a primary-side turn-off signal at time t2, and transmits, via the isolation element 71, a pulse signal to the driver 3 as the primary-side turn-off signal PWM1_off. When the driver 3 detects a falling edge of the primary-side turn-off signal PWM1_off at time t3, it switches the power switch SW into turn-off state.

At time t4, the feedback control module 7 detects that the voltage Vds_SR across the synchronous rectifier SR meets a turn-on condition according to a turn-off threshold of the synchronous rectifier SR, and then generates a secondary-side turn-on signal to control the synchronous rectifier SR to be turned on, and the transformer TR begins to release energy towards the secondary side. Starting from this moment, the current of the secondary side of the transformer TR begins to gradually decrease.

During a time period from t4 to t5, the voltage Vds_SR between the two terminals of the synchronous rectifier SR is at low level and is lower than the output voltage Vo. Therefore, during this time period, the voltage-controlled current source I1 discharges the first capacitor C3 according to the voltage-controlled voltage which is less than 0, so that the voltage Ramp across the first capacitor C3 begins to gradually decrease.

At time t5, the feedback control module 7 detects that the voltage Vds_SR across the synchronous rectifier SR meets a turn-off condition according to the turn-off threshold of the synchronous rectifier SR, and then generates a secondary-side turn-off signal to control the synchronous rectifier SR to be turned off.

The time period t5~t6 is a resonance period of the flyback converter.

Based on the control frequency of the flyback converter, the flyback converter starts a new switching cycle at time t6, and then the feedback control module 7 transmits a pulse signal to the driver 3 via the isolation element 71 at time t6 as the primary-side turn-on signal PWM1_on. When the driver 3 detects a falling edge of the primary-side turn-on signal PWM1_on at time t7, it controls the power switch SW to be turned on, and repeats the above process.

Further, before generating the primary-side turn-on signal in each switching cycle, the control method of the flyback converter further comprises: during a turn-off period of the primary-side power switch SW, determining the operating mode of the flyback converter according to the voltage Vds_SR between the two power terminals of the synchronous rectifier SR and the output voltage Vo of the flyback converter; when it is determined that the flyback converter is operated under a DCM mode, controlling the switching switch Q1 to be turned on by a turn-on signal generated by the mode detection unit, resetting the voltage Ramp which is across the first capacitor C3, and after the voltage Ramp across the first capacitor C3 is reset to 0V, continuing with a next switching cycle.

Figure 7:
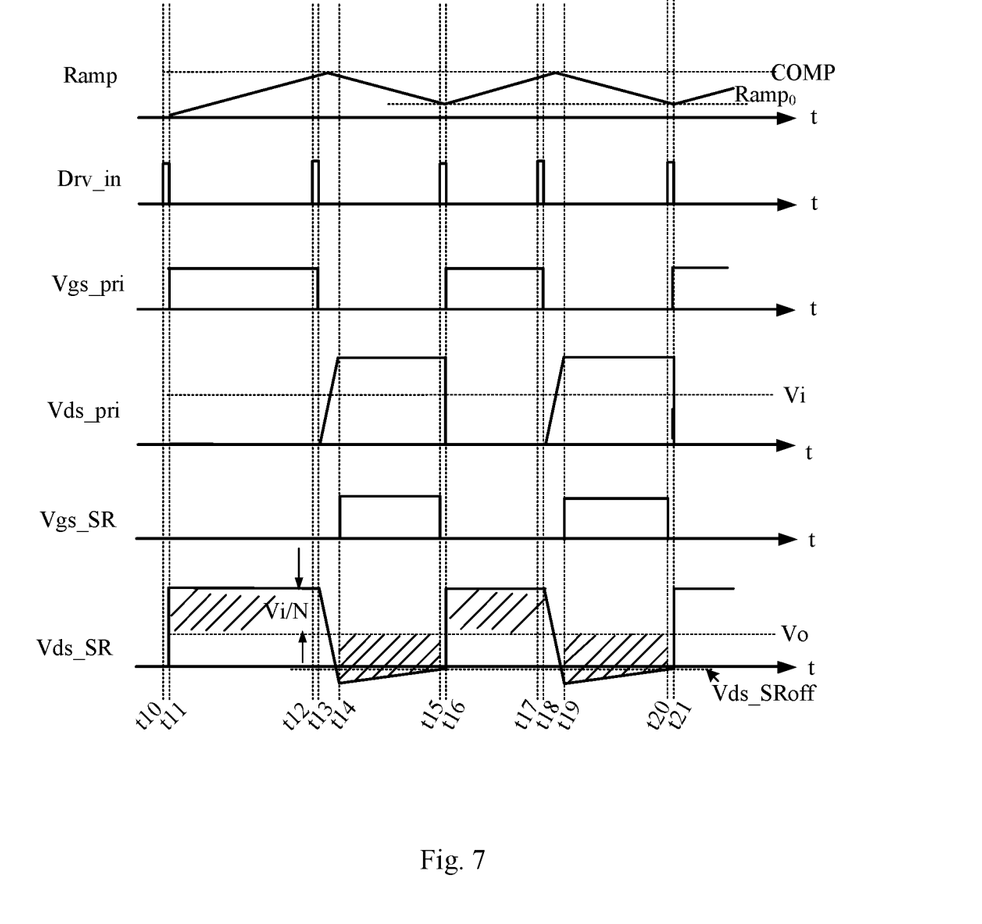
FIG. 7 shows a timing waveform diagram of some signals in a flyback converter operated under CCM mode according to an embodiment of the present disclosure.

In the case where it is determined that the flyback converter is operated in a CCM mode, referring to FIG. 7, similarities of the specific operation principle as described above will not be repeated. A difference is that the voltage-controlled voltage received by the voltage-controlled current source I1 is changed, thereby changing the magnitude of the current for discharging and charging the first capacitor C3. At the same time, during a turn-off period of the primary-side power switch SW, the voltage Ramp across the first capacitor C3 is not reset, so that after a new switching cycle is started, the voltage Ramp across the first capacitor C3 does not start to rise from 0V, but continues to rise based on an initial voltage which is greater than 0V. And at time t15 in FIG. 7 (corresponding to time t6 in FIG. 6), the feedback control module 7 detects that the voltage Vds_SR across the synchronous rectifier SR does not meet the turn-on condition according to the turn-off threshold of the synchronous rectifier SR, but at this time, the driving interlocking unit 76 in the feedback control module 7 detects the turn-on signal PWM1_on of the primary side, the synchronous rectifier SR is also controlled to be turned off, and then the power switch SW is turned on, thereby effectively preventing a shoot-through problem of the synchronous rectifier SR and the power switch SW under the CCM mode. This control method does not need to decrease the drive voltage like what is implemented by the traditional synchronous rectifier controller, in terms of control method, thereby improving system efficiency.

In the present disclosure, the feedback control module 7 at the secondary side transmits a short-time pulse signal to the driver 3 at the primary side to alternately serve as the primary-side turn-on signal PWM1_on and the primary-side turn-off signal PWM1_off, and then switches the state of the power switch SW. Specifically, when the driver 3 switches the state of the power switch SW according to the falling edge of the pulse signal, it identifies whether the pulse signal is the primary-side turn-on signal PWM1_on or the primary-side turn-off signal PWM1_off according to the state of the power switch SW before the switching. If the power switch SW is under turn-on state before a falling edge of the pulse signal is detected, then the power switch SW is switched to turn-off state after that falling edge of the signal is detected; otherwise, if the power switch SW is under turn-off state before a falling edge of the signal is detected, then the power switch SW is switched to turn-on state after that falling edge of the signal is detected. In other words, the driver 3 performs turn-on and turn-off control on the power switch SW according to the pulse signal received at the Drv_in pin of the driver 3 alternately. At the same time, based on high level duration of the pulse signal, turn-on and turn-off time delay can also be realized on the primary-side power switch SW, thereby further avoiding driving shoot-through of the primary side and the secondary side. In a specific implementation process, the pulse signal can be generated by a pulse generator based on the output of the comparator U1, and a delay unit can also be disposed in the driver 3 to achieve the same function.

Based on the above structure and control method, an equivalent peak current control of the flyback converter can be realized without performing voltage sampling at the primary side during an entire control process of the flyback converter. Therefore, there is no need to dispose a sampling resistor at the primary side of the flyback converter. Under a condition of ensuring high system efficiency, system loss can be further reduced, and the circuit structure is simple.

However, considering the CCM mode of the flyback converter, a sampling resistor Rs, which has a resistance much lower than that of a resistor used in a conventional peak current control method, can be disposed at the primary side, and the driver 3 can sample a peak voltage of the primary side through the sampling resistor Rs at the CS pin to realize current limitation on a maximum peak current of the primary side of the flyback converter. As shown in FIG. 2, the sampling resistor Rs can be disposed between the source of the power switch SW and the reference ground. And in FIG. 2, the sampling resistor Rs is drawn with a dotted line, indicating that the sampling resistor Rs is not an essential element in technical solutions according to the present disclosure, and when the sampling resistor Rs is not needed, the CS pin of the driver 3 can also be saved.

It can be understood that the above-described connection relationship is only an exemplary embodiment of the present disclosure, and in other embodiments of the present disclosure, if the two terminals of the primary winding $N_P$ of the transformer TR and the two terminals of the secondary winding $N_S$ are exchanged, the same function can also be achieved.

Finally, it should be noted that: obviously, the above-mentioned embodiments are only examples for clearly illustrating the present invention, and are not intended to limit the implementations. A person with ordinary skill in the art may further make other changes or variations in a different form on the basis of the above description. Herein, examples are unnecessarily provided for all implementation manners. However, the obvious changes or modifications derived from this are still within the protection scope of the present invention.

What is claimed is:

1. A flyback converter, comprising:
   a transformer, comprising a primary winding and a secondary winding;
   a power switch and a voltage input circuit, which are connected to the primary winding;
   a synchronous rectifier and a voltage output circuit, which are connected to the secondary winding;
   a driver, connected to the power switch;
   a feedback control module, connected to the synchronous rectifier and an output terminal of the flyback converter, respectively; and
   an isolation element, connected to the driver and the feedback control module, respectively,
   wherein, the feedback control module comprises:
   a primary-side control signal generating unit, configured to output a primary-side turn-on signal to the driver when a new switching cycle of the flyback converter is started, and in each switching cycle, obtain a voltage to be compared according to a voltage across the synchronous rectifier and an output voltage of the flyback converter, and generate a primary-side turn-off signal to the driver according to a comparison result obtained by comparing the voltage to be compared and a reference voltage, wherein the primary-side control signal generating unit is configured to generate the primary-side turn-off signal when the voltage to be compared is higher than the reference voltage;

the driver, configured to implement turn-on control on the power switch according to the primary-side turn-on signal, and turn-off control on the power switch according to the primary-side turn-off signal.

2. The flyback converter according to claim 1, wherein, the flyback converter is operated under constant frequency control mode, and a start time of each switching cycle of the flyback converter is fixed; or the flyback converter is operated under variable frequency control mode, and the primary-side control signal generating unit comprises:

a zero-crossing detection unit, configured to perform zero-crossing detection on the secondary winding to determine a start time of a new switching cycle.

3. The flyback converter according to claim 1, wherein the primary-side control signal generating unit further comprises:

a calculation unit, configured to perform calculation on the voltage across the synchronous rectifier and the output voltage of the flyback converter according to a preset formula to obtain a voltage-controlled voltage;

a first capacitor;

a voltage-controlled current source, having a voltage-controlled input terminal receiving the voltage-controlled voltage, and an output terminal connected to a first end of the first capacitor, wherein a second end of the first capacitor is connected to a reference ground;

a comparator, having a non-inverting input terminal connected to the first end of the first capacitor, an inverting input terminal receiving the reference voltage, and an output terminal connected to an input terminal of the isolation device, wherein, a voltage of the first end of the first capacitor is the voltage to be compared.

4. The flyback converter according to claim 3, wherein the primary-side control signal generating unit further comprises:

a sampling unit, configured to sample the voltage across the synchronous rectifier and the output voltage of the flyback converter.

5. The flyback converter according to claim 1, wherein, the reference voltage is an error amplification signal, and the feedback control module further comprises:

an error amplification signal generating unit, connected to the output terminal of the flyback converter, and configured to generate the error amplification signal according to the output voltage of the flyback converter.

6. The flyback converter according to claim 5, wherein, the reference voltage is a voltage-type control reference signal, and the feedback control module further comprises:

a voltage conversion unit, configured to convert the error amplification signal into the voltage-type control reference signal according to a preset relationship curve.

7. The flyback converter according to claim 3, wherein the primary-side control signal generating unit further comprises: a mode detection unit and a switching switch, the mode detection unit is configured to detect the voltage across the synchronous rectifier and the output voltage of the flyback converter during a turn-off period of the power switch, and generate a turn-on signal to the switching switch when detecting that the voltage across the synchronous rectifier is greater than the output voltage of the flyback converter;

the switching switch has a first current-conducting terminal connected to the first end of the first capacitor, a second current-conducting terminal connected to the second terminal of the first capacitor, and a control terminal connected to the mode detection unit, and the switching switch is configured to be turned on when receiving the turn-on signal to perform voltage reset on the first capacitor.

8. The flyback converter according to claim 3, wherein the feedback control module further comprises: a sample-and-hold unit and an initial value acquisition unit, wherein when the mode detection unit detects that the voltage across the synchronous rectifier is less than or equal to the output voltage of the flyback converter during a turn-off duration of the power switch, the sample-and-hold unit is configured to sample the voltage across the synchronous rectifier at a turn-off time of the synchronous rectifier, and obtain current information of the synchronous rectifier at the turn-off time based on the voltage across the synchronous rectifier;

the initial value acquisition unit is configured to obtain an initial value of the voltage across the first capacitor in a next switching cycle according to the current information of the synchronous rectifier or the voltage across the synchronous rectifier sampled by the sample-and-hold unit, wherein, the initial value is equal to a product of the voltage across the synchronous rectifier and a preset proportional coefficient.

9. The flyback converter according to claim 3, wherein the voltage-controlled voltage is approximately equal to a difference between the voltage across the synchronous rectifier and the output voltage of the flyback converter.

10. The flyback converter according to claim 1, wherein the flyback converter further comprises:

a sampling resistor, connected between the power switch and the reference ground.

11. The flyback converter according to claim 1, wherein the isolation element comprises any one of an isolation transformer, an optocoupler device, an isolation capacitor and an isolation chip.

12. The flyback converter according to claim 1, wherein the feedback control module further comprises:

a secondary-side control signal generating unit, configured to generate a secondary-side turn-on signal or a first secondary-side turn-off signal according to a voltage between two power terminals of the synchronous rectifier;

a driving interlocking unit, configured to generate a second secondary-side turn-off signal when receiving the primary-side turn-on signal, wherein the synchronous rectifier is turned on when receiving the secondary-side turn-on signal, and is turned off when receiving any one of the first secondary-side turn-off signal and the second secondary-side turn-off signal.

13. A control method of a flyback converter, which comprises a primary winding, a secondary winding, a power switch connected to the primary winding, and a synchronous rectifier connected to the secondary winding, wherein the control method comprises:

generating a primary-side turn-on signal at a secondary side of the flyback converter at a start time of each switching cycle of the flyback converter;

in each switching cycle, obtaining a voltage to be compared based on a voltage across the synchronous rectifier and an output voltage of the flyback converter, and generating a primary-side turn-off signal at the secondary side of the flyback converter when a comparison result obtained by comparing the voltage to be compared and a reference voltage indicates that the voltage to be compared is higher than the reference voltage;

transmitting the primary-side turn-on signal and the primary-side turn-off signal to a primary side of the flyback converter via a single isolation element, to control the power switch to be turned on and off alternately; and in each switching cycle, sampling a voltage between two power terminals of the synchronous rectifier, and controlling the synchronous rectifier to be turned on and off according to the primary-side turn-on signal and a sampling result obtained by the sampling.

14. The control method according to claim 13, wherein in each switching cycle, obtaining the voltage to be compared based on a voltage across the synchronous rectifier and an output voltage of the flyback converter, and generating the primary-side turn-off signal at the secondary side of the flyback converter when the comparison result obtained by comparing the voltage to be compared and the reference voltage indicates that the voltage to be compared is higher than the reference voltage comprises:

in each switching cycle, charging and discharging a first capacitor based on the voltage across the synchronous rectifier and the output voltage of the flyback converter, and when a voltage across the first capacitor is greater than the reference voltage, generating the primary-side turn-off signal at the secondary side of the flyback converter.

15. The control method according to claim 13, wherein, when the flyback converter is operated under constant frequency control mode, a start time of each switching cycle of the flyback converter is fixed;

when the flyback converter is operated under variable frequency control mode, zero-crossing detection is performed on the secondary winding, and the start time of each switching cycle is determined according to a zero-crossing detection result obtained by the zero-crossing detection.

16. The control method according to claim 13, wherein the reference voltage is an error amplification signal obtained according to the output voltage of the flyback converter; or the reference voltage is a voltage-type control reference signal obtained by converting an error amplification signal according to a preset relationship curve after the error amplification signal is obtained.

17. The control method according to claim 14, wherein charging and discharging the first capacitor based on the voltage across the synchronous rectifier and the output voltage of the flyback converter comprises:

sampling the voltage across the synchronous rectifier and the output voltage of the flyback converter;

performing calculation on the voltage across the synchronous rectifier and the output voltage of the flyback converter according to a preset formula to obtain a voltage-controlled voltage; and controlling a voltage-controlled current source to charge and discharge the first capacitor according to the voltage-controlled voltage.

18. The control method according to claim 13, wherein before generating the primary-side turn-on signal, the control method further comprises:

determining an operating mode of the flyback converter according to the voltage between the two power terminals of the synchronous rectifier and the output voltage of the flyback converter, and when it is determined that the flyback converter is operated under a discontinuous current mode, performing a voltage reset on the voltage across the first capacitor.

19. The control method according to claim 18, wherein when it is determined that the flyback converter is operated under a continuous current mode, an initial value of the voltage across the first capacitor in a next switching cycle is obtained by sampling the voltage across the synchronous rectifier or current information of the synchronous rectifier.

20. The control method according to claim 13, wherein controlling the synchronous rectifier to be turned on and off according to the primary-side turn-on signal and the sampling result obtained by the sampling comprises:

determining whether the voltage between the two power terminals of the synchronous rectifier satisfies a turn-off condition, and controlling the synchronous rectifier to be turned off when it is determined that the turn-off condition is satisfied; or controlling the synchronous rectifier to be turned off when it is detected that the primary-side turn-on signal is generated.

* * * * *